May 17, 1966  P. H. ACLOQUE  3,251,726
SHEET OF STRUCTURAL TEMPERED GLASS
Filed Feb. 23, 1962
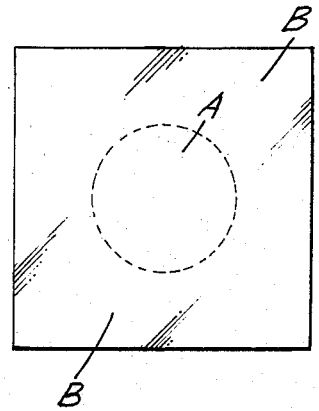
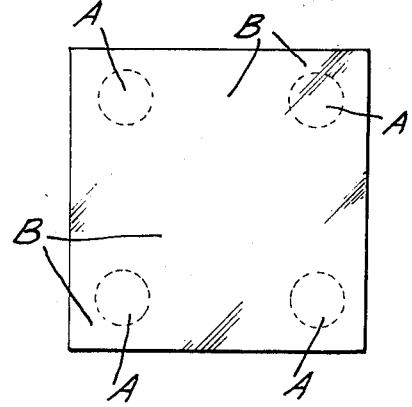
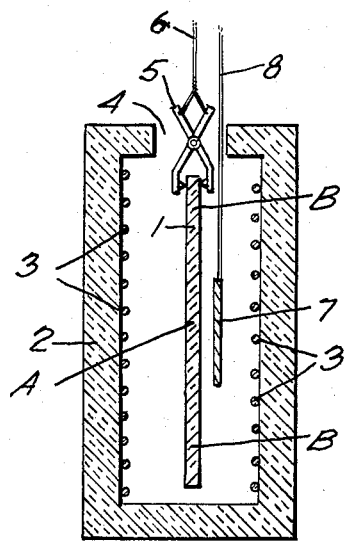
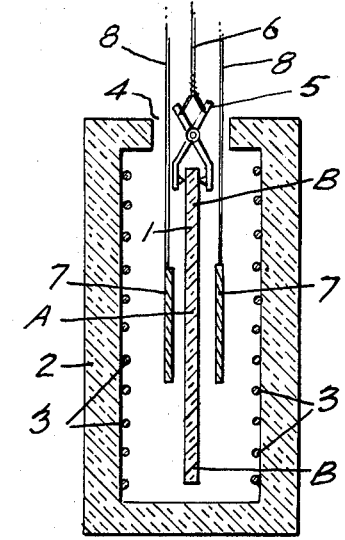
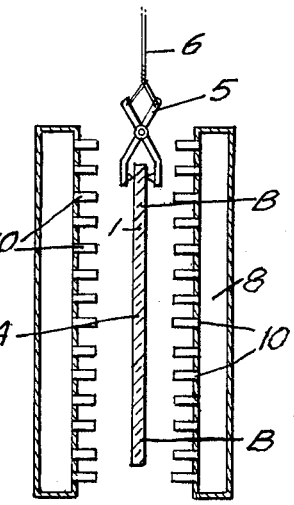
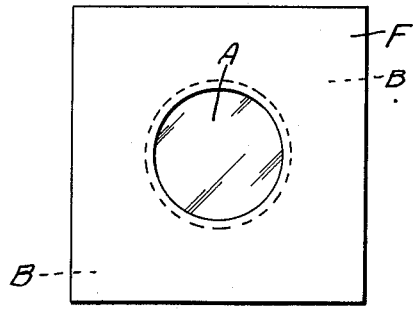
INVENTOR
PAUL HENRI ACLOQUE
BY Albert L. Frey
ATTORNEY 3,251,726
SHEET OF STRUCTURAL TEMPERED GLASS
Paul Henri Acloque, Paris, France, assignor to Compagnie de Saint-Gobain, Neuilly-sur-Seine, France
Filed Feb. 23, 1962, Ser. No. 175,239
Claims priority, application France, Oct. 25, 1954, 678,471
The portion of the term of the patent subsequent to Mar. 12, 1980, has been disclaimed
5 Claims. (Cl. 161—1)

This application is a continuation-in-part of my application Serial No. 556,764, filed October 21, 1955, now abandoned.

This invention relates to a new product consisting of a sheet, plate or slab of glass, flat or curved, transparent, colored or opaque, of which certain portions or selected zones, so-called "compressed up to the interior" are subjected, under the influence of the surround zone, acting in the manner of a hoop to a system of stresses in such a way that at each one of their points the stresses parallel to the faces of the sheet, plate or slab are, whatever their direction may be, compressive stresses, while in the rest of the sheet or slab, a system of stresses characteristic of tempered glass prevails, with high compressive stresses on the surface and corresponding tensile stresses on the interior.

Another object of the invention is to provide a method for manufacturing said new product, which consists of heating the sheet or plate of glass to a temperature near that of softening and then subjecting it to rapid chilling, the heating operation being performed by protecting the portion or selected zone which is to be compressed up to the interior by means of a screen of low heat capacity and low emissive capacity of approximately the size and shape chosen for the said portion or selected zone, the temperature difference between the said portion or selected zone and the adjacent area or surrounding zone of the interposed screen, being such that the hooping force created by the adjacent area or surrounding zone during the last cooling process is sufficient to set up compressive stresses up to the interior of the said portion or selected zone.

It is the object of the invention to present an improvement over that disclosed in the United States Patent No. 2,910,807, November 3, 1959, which is assigned to the assignee of the instant application, and to advance the art thereover. By executing the differential heat treatments of the surrounding and reserved zones of the sheet of glass in an especially controlled manner, and the consequent compression or hooping of the reserved zone by the surrounding zone, novel and desirable stress characteristics are imparted to the glass in the reserved zone which makes it useful for purposes never contemplated heretofore.

Thus, it is the object of the present invention to produce a sheet of tempered glass provided with one or more reserved zones therein, having objectives and purposes different from the sheets of tempered glass contemplated in Patent No. 2,910,807. Whereas the primary utility of the sheets of tempered glass with reserved zones therein, as contemplated in Patent No. 2,910,807 and the other patents of the prior art were for safety glass for use in windshields, having the objective that an accidental fracture produced in one zone was limited from spreading to another zone, to maintain a satisfactory degree of visibility, without fragmentation, the primary utility of the tempered glass in accordance with the instant invention is for structural purposes. Pursuant thereto, it is desirable to provide one or more reserved zones in a sheet of tempered glass, which zones may be pierced or penetrated intentionally for the accommodation of structural fittings without the development of incipient cracks or fracture within the reserved zones. For this purpose, the reserved zone is conditioned so that the stresses therein, which are parallel to the surface of the sheet, are designed to be constituted exclusively by compression stresses throughout the entire thickness thereof. Thereafter, localized perforation or penetration throughout its depth may be effected intentionally by a punch, chisel or drill, without spreading of the fracture within the reserved zone which is surrounded by a zone consisting of tempered glass which is characterized normally by compression stresses on the surface of the glass and tensile stresses on the interior thereof.

Details of the invention will hereinafter appear and reference may be had to the accompanying drawings wherein, FIG. 1 is a front view of a sheet of glass having a selected zone or area defined by way of example by the dotted lines, surrounded by another zone or area exerting the critical compression upon the selected zone throughout its entire thickness;

FIG. 2 is a view, similar to FIG. 1, indicating, by way of example, a plurality of selected zones;

FIG. 3 is a diagrammatic view of the interior of an electric furnace for heating the glass sheet and the introduction of a screen located to one side of and spaced from the glass sheet;

FIG. 4 is a view similar to FIG. 3 showing the use of a screen at opposite sides of the glass sheet;

FIG. 5 is a diagrammatic view of the blow boxes with the glass sheet between the same for the rapid chilling of the sheet; and FIG. 6 is a front view of a protective plate of tempered glass fitted with a mechanical reenforcing frame.

In FIG. 1, A designates a selected zone or area of a glass sheet 1, defined for example by the dotted lines, surrounded by the zone B. This surrounding zone B, according to the invention herein described exerts compressive stresses upon selected zone A throughout its entire thickness.

In FIG. 2, the plurality of selected zones A are subjected to the same action of the surrounding zones B as just indicated in connection with FIG. 1.

In FIG. 3, a furnace 2, suitably heated by electrical resistor elements 3, is provided with an opening 4 for the introduction of the glass sheet 1 by means of the usual tongs 5 and cables 6. This figure shows the heating of the glass sheet in the presence of a screen 7, spaced from the glass sheet and approximating the size and shape of the selected zone A. The screen 7, attached to the cable 8 may be raised and lowered and moved laterally.

The heating of the sheet is maintained in the presence of the screen to control the temperature differences. When these temperature differences have been established, the screen 7 is removed from its position adjacent the glass sheet 1, and the sheet is removed from the furnace. Thereupon the heated sheet is lowered or otherwise placed in position between oppositely placed blowing boxes 8 provided with nozzles or openings 10, as shown in FIG. 5. A chilling medium, for example air under pressure, is introduced into the blow boxes 8 from a suitable source (not shown) and projected from the nozzles 10 onto the opposite surfaces of the glass sheet to rapidly and energetically chill the same.

In FIG. 4 there are shown screens 7 at opposite surfaces of the sheet 1 and spaced therefrom within the heating furnace 2. These screens, like single screen of FIG. 3 have approximately the size and shape of the selected zone A which undergoes compression, and may be raised and lowered and moved laterally.

In FIG. 6 is shown a sheet of tempered glass which is useful as a protective plate or window. The reserved zone A having compressive stresses through the entire thickness thereof may be used alone for constituting the safety window capable of resisting extremely violent shocks, without the fracture spreading through the reserved zone. The surrounding zone B which exerts a hooping or compressive stress on the reserved zone may be reenforced mechanically by the frame F entirely coving said surrounding zone.

The reserved zone A may be of any desired size relative to the sheet, within certain limits described in greater detail below and may be located either at the center as shown in FIG. 1, or at the corners as shown in FIG. 2, or in any other location depending upon the specific application and mounting of the sheet, i.e., whether it is used for facing, sheathing sheeting, or in sanitary installations, etc.

In order to realize the product of the invention, it is necessary that the compression stresses exerted by the surrounding zone upon the reserved zone be greater than the tensile stresses which are developed there during chilling, at every point of the inner layers of this reserved zone. In order to obtain a product with zones capable of resisting the bending stresses of piercing, it is sufficient, in practice, that the hooping stress be, for glass of 5 mm. to 7 mm. thickness, in excess of 20 to 30 kg. cm.$^2$ with respect to the maximum tensile stress at the center layer of the reserved zone, but it is preferable to have an excess of hooping stress of the order of 100–150 kg./cm.$^2$.

Examples of products according to the invention are given hereafter in order to show the structural and functional advantages of reserved zones less tempered than the surrounding zones, which by virtue of the critical timing of the solidification of the glass in the two zones as the same are cooled, result in the exertion of radial and tangential or circumferential compressive stresses of the surrounding zone on the reserved zone.

Several samples of glass sheets of the same dimensions were treated with screens of the same dimensions to obtain different conditions of temper in the reserved zone.

Following is a tabulation of the test results on five sample specimens of glass sheets of a size of 35 x 35 cm. and of a thickness of 5.7 mm. treated in the manner illustrated in FIGS. 4 to 5. The screens protecting the reserved zone have a diameter of 18 cm. and each is constituted by an asbestos sheet 5 mm. in thickness, affixed to a metal plate of 3 mm. thickness.

*Table*

| Specimen number | Time in seconds that screens remain in position | Hooping compression in kg./cm.$^2$ | Tension at core of reserved zone due to tempered state there in kg./cm.$^2$ | Resultant stress at core of the reserved zone in kg./cm.$^2$ |
|---|---|---|---|---|
| (1) | 30 | 240 | 220 | Comp. 20. |
| (2) | 35 | 280 | 170 | Comp. 110. |
| (3) | 45 | 350 | 155 | Comp. 195. |
| (4) | 55 | 364 | 100 | Comp. 264. |
| (5) | 65 | 420 | 25 | Comp. 395. |

(Comp.=compressive stress.)

One or both asbestos sheets were placed in contact with the protected part of the glass sheet when in masking position. The heating furnace was operated at 720° C. and the blower pressure was 430 mm. of water. The blower nozzles were at a distance of 11 cm. from the surfaces of the glass sheets. Each specimen remained in the heating furnace three minutes and thirty seconds and the screens were taken out of the furnace at the end of three minutes and twenty-five seconds, which was followed closely thereafter by the removal of the heated sheets for placement in the blowing chamber.

The screens were put in place on the glass sheet at different times for each of the specimens in order to obtain different heating periods for the reserved zone relative to the surrounding zone, followed by the shielding periods immediately prior to the withdrawal of the screens and the glass sheets from the furnace.

The reserved zone of sample (1) was shielded for thirty seconds by inserting the screen into the furnace at the end of two minutes, fifty-five seconds, and withdrawing it at the end of three minutes, twenty-five seconds.

Sample (2) was shielded for thirty-five seconds by inserting the screen at the end of two minutes fifty seconds; sample (3) was shielded for forty-five seconds by inserting the screen at the end of two minutes forty seconds; sample (4) was shielded for fifty-five seconds by inserting the screen at the end of two minutes thirty seconds; and sample (5) was shielded for sixty-five seconds by inserting the screen at the end of two minutes twenty seconds, all of the screens in these instances being removed, as stated above, at the end of three minutes, twenty-five seconds.

The third column tabulates the hooping compression exerted by the glass of the surrounding zone on the reserved zone in consequence of the different degrees of heat of the former relative to the latter when both areas were subjected to uniform chilling in the blower shown in FIG. 5.

The fourth column tabulates the tensile stresses at the core of the reserved zone due to the tempered condition thereof for the different degrees of heat in consequence of the different period of time that the reserved zones were protected by the screens against the heat in the furnace.

The fifth column tabulates the resultant stresses at the core or central layer of the reserved zone in consequence of the compression forces acting thereon by the hooping effect of the surrounding zone, and the tensile stress in the core of the reserved zone in consequence of the tempered state of the glass thereat. The numbers mentioned in the fifth column are the differences between the numbers of the third column and those of the fourth column.

Samples (1), (2), (3), (4) and (5) showed a predominant compressive stress at the core of the reserved zone and consequently throughout the whole thickness of the glass, as in the surface layers, the compression, which is a natural characteristic of tempered glass, is added to the compression stresses of the hoop by the surrounding zone.

The analysis of these stresses set forth in the table were conducted with analytical instruments of the type disclosed in the applicant's Patent No. 2,995,060, August 8, 1961, and in French Patent No. 1,243,476, owned by the assignee of the instant application.

The applicant discovered that those samples which had compressive stresses throughout the entire thickness thereof, including the core of the reserved zones, could be pierced or perforated without production of incipient cracks within the reserved zone.

Thus, the applicant established the practicability of producing a sheet of tempered glass having areas less tempered than surrounding areas to attain the structural advantages of tempered glass while rendering the same workable for the purpose of piercing or perforation at the required locations for the installation of the sheet. For practical uses the compression stresses are of sufficient value that they resist the bending stresses resulting from the piercing of the reserved zone. Of course, the capability of piercing or perforating the sheet at the reserved zone is supplemental to the high resistance of the reserved zone when a strong mechanical or thermal shock is imposed upon it.

The product according to the invention is particularly interesting in construction, because piercing of the glass for the purpose of attaching sheets or plates can be made at any desired place, directly on the block, by percussion, with a tamping tool or glazier's diamond. The difficulties which glass presents in construction applications are well known, for example in facings, sheathing, sanitary installations, etc., when it is simply annealed, because piercing cannot be accomplished except by specialists taking great precautions. In fact, glass has poor resistance to tension stresses to which it is subjected during the piercing operation. On the other hand, when it is a question of tempered glass, the utilization of which is so desirable to resist shocks and notably mechanical shocks, streams of hot water, etc., the perforation must be made before tempering according to a specific design, and may not be changed in any way while being positioned without causing complete destruction of the glass sheet. Thus, the great interest in the product according to the present invention is understood, for application to construction where glass is being used more and more.

The present invention lends itself easily to obtaining different products in which the zones compressed at the center, capable of being pierced are located at different places in the sheet or plate of glass according to the applications for which they are designed. It is possible also to vary in very high proportions the dimensions of these zones compressed at the center. This is how it is possible to obtain sheets or plates of tempered glass having a central zone of large dimensions, or sheets or plates in which the zones compressed at the center and of reduced dimensions are placed in the neighborhood of an edge of the sheet or at the corners thereof, particularly when plates for sheathing are involved.

The heat treatment can obviously be conducted in such a way as to develop any convenient excess of the hooping compression with respect to the maximum tension at the core of the reserved zone. But there is a limit due to the fact that in the surrounding zone, tensile stresses develop as a counterpart. In order for the product to have overall stability, is is desirable that there be no tensile stresses at any point of the surface of the surrounding zone. It is then necessary that the tensile stresses of hooping of the surrounding zone be, at each point of the surface of this zone, no greater than the compression stresses which develop there through chilling. Moreover, in order to have sufficient strength and stability, it is necessary that the stresses at the periphery of the glass sheet be compression stresses.

The dimensions of the perforable compressed zones may vary. When provision for the attachment to a plate of 5 mm. to 7 mm. thickness along one of its edges or at the corners is involved, it is sufficient to establish circular compressed zones the diameter of which is a few centimeters. Compressed zones having diameters of 4 cm. present properties suitable for being perforated with steel points on which one taps with a hammer, and these may be arranged at a distance of 4 cm. from the edge of the glass. The hooping stress was about 1.5 fringes per cm. of glass traversed.

When a circular zone of greater dimensions is concerned, the surface of that zone may reach about half of the surface of the sheet of glass of 5 mm. to 7 mm. thickness. Products having hooping stresses of 1.25 to 1.75 fringes per cm. of glass traversed have been obtained with central reserved zones whose diameter is equal to half of the smallest dimension of the sheet of glass.

While a wide variation of the size and location of the reserved zones relative to the surrounding zones may be made to adapt the invention to varying needs, it has been found that reserved zones smaller in size than 2 cm. in diameter are not practical since for such small areas the differences in heat diffusion afforded by protective screens fail to give rise to sufficiently large heat differentials to produce the desired hooping stresses on such small areas. On the other hand, circular reserved zones of 18 cm. in diameter have been obtained on square specimen sheets measuring 26 cm. on each side. Thus, the ratio of the reserved surface to the total surface may be 38%. The hooping compression in this case is 600 kg./cm.$^2$, with a compression of 100 kg./cm.$^2$ at the core of the reserved zone. At a point situated in the surrounding zone, 2 cm. from the edge of the sheet, the radial compression of the surface amounts to 1400 kg./cm.$^2$ and the circumferential compression is 480 kg./cm.$^2$. It is difficult to exceed a 0.5 ratio between the reserved zone and the total surface without creating a dangerous circumferential state of tension in the surrounding zone.

As stated above, it is necessary that the compression stress developed by the surrounding zone be exerted at each point of the reserved or surrounded zone and in all directions, and that this compression stress exceed in value by a quantity more or less substantial according to the desired applications, the tension stress at the same point and in each direction, which has been produced by a greater or lesser degree of temper in the reserved zone. This result will be the more surely obtained as one has taken greater precautions to attain a state of temper in the reserved zone which is more uniform and weaker with respect to the hooping stresses.

The uniformity of the state of temper in the reserved zone will result from the uniformity of heating and cooling of this zone over its entire extent. This state will be obtained by a uniform screen whose distance at the surface of the glass is uniform and as small as possible, and even preferably null, as may be obtained by a screen in contact with the sheet of glass. Such an arrangement serves to avoid irregularities of heat exchanges during heat treatment as a result of the layer of air interposed between the screen and the sheet, and the consequent convection currents.

As far as temperatures are concerned, the different factors controlling the values of the stress are (1) the difference in temperature of the two types of zones at the end of heating, and (2) the difference in temperature of the two types of zones at the moment when the surrounding zone solidifies, which should occur after the solidification of the reserved zone.

For uniform cooling, the greater the difference of temperature of the two types of zones at the end of heating, the greater is the difference in the degrees of temper of the two types of zones, and the greater is the effect of hooping. Nevertheless, this difference of temperature at the end of heating is limited, on one hand, by the temperature of the surrounding zone, which cannot be raised to a too high degree if it is desired to avoid deformation, and on the other hand, by the value of the minimum temperature at which the reserved zone can be maintained. In fact, if the reserved zone is maintained too rigid with respect to the surrounding zone, there arise risks of formation of flanges around the former, and even risks of breakage during chilling.

In order to attain the product of the invention, one can therefore select the nature of the screen, its position with respect to the sheet of glass, and the length of time this screen is in place with respect to the sheet in order to regulate conveniently the difference in temperature at the end of heating according to the hooping compression desired to be obtained, and according to the maximum temper tensile stress which are obtained at all points of the center layer of the reserved zone.

The speed of cooling may likewise be regulated to control the state of temper of the two types of zones. A uniform and rapid chilling of the sheet imparts to the surrounding zone the characteristics of highly tempered glass, but, for the same difference in temperature at the end of heating, the reserved zone, although less tempered, will have a certain degree of temper. In the case where cooling is uniform and slower, the surrounding zone will be moderately tempered and the reserved zone slightly tempered.

Products having the characteristics of the invention have been obtained with ambient air tempering without blowing. Thus, products have been obtained whose hooping stresses correspond to 0.75 to 1 fringe, which had the same resistance qualities as in the case of a temper by blowing, producing a hooping stress of 1.50 to 2 fringes by cm. of glass traversed by polarized light i.e. 337 to 450 kg./cm.²

It is understood that with a less rapid chilling, and in particular with air tempering, it is possible to be satisfied with a smaller temperature difference at the exit from the furnace, which is advantageous in avoiding risks of deformation.

The applicant has discovered that many variations may be made in the procedures described above and that good results are obtainable by using a thin sheet of polished metal as a screen, for example, a sheet of aluminum. For the normal durations of the process, such aluminum screens do not reach their fusion points under the conditions which are encountered.

A double screen acting on both surfaces of the glass sheet may be used, but a single screen may also be placed between one of the walls of the heating furnace and one of the glass surfaces. The use of one screen instead of two constitutes another control factor of the temperature difference introduced in the sheet of glass.

The more or less closer proximity of the screen with respect to the glass permits, likewise, the regulation of the amount of hooping force obtained, the latter being greater as the sheet is placed nearer to the screen.

The process according to the invention applies also to the manufacture of sheets or plates incorporating several areas or selected zones A compressed up to the interior by surrounding zones B, see for example FIG. 2. The temperature difference between such areas and the surrounding zone is then obtained by the insertion of several screens.

The polariscopic observation in white light between crossed polarizers of the product according to the invention shows in the zone B surrounding the portion or selected zone A compressed up to the interior birefringence expressing the state of hooping, i.e. a restoration of more or less colored light, which an examination with a compensator (such as the Babinet compensator, for example), proved to be due to a radial compression and a circumferential extension, while the compressed interior part or zone A remains dark throughout.

The applicant has discovered that, in sheets or plates of glass according to the invention, the portion or surrounding zone B non-compressed up to the interior not only has the qualities of tempered glass, but that, in addition, the parts or selected zones A with compressed stresses present the following remarkable properties: on the one hand, they can resist extremely severe shocks whether mechanical or thermal without cracking or shattering, and on the other hand, when damaged or perforated by a shock, the removal of the damaged part is not accompanied by any incipient farther cracking, as is the case with ordinary glass products or material of the same fragility. With the help of these observations the applicant has discovered that the new product can be used as safety glass, either by using the whole sheet or the compressed interior area only with a suitable framing in addition to the other applications described above.

The following portray two additional examples of the procedures for making a sheet of glass according to the invention, having an area compressed up to the interior in its center.

*Example I.*—A glass plate of 40 x 40 x 0.6 centimeter size, suspended vertically, is placed in a resistor furnace of the type commonly used for tempering, raised to a mean temperature of 715° C. After one minute twenty seconds' stay in this furnace, a sheet aluminum disk, 1 mm. thick, is placed 4 mm. before one side of the sheet center, and the heat maintained for one minute, twenty seconds. Then the screen is removed, the sheet pulled out of the furnace and carried immediately between the blowing boxes of the type commonly used for rapid chilling in tempering operations.

In these conditions the isotropic stress in the immunized zone represents a birefringence of 1 fringe per centimeter of glass passed through, while the tension at the interior, after relaxation of the hooping effect, is 0.85 fringe per centimeter. Hence, even at the interior, there is an excess of compression of about 35 kg./cm.².

*Example II.*—A glass plate of 40 x 40 x 0.6 centimeter size, suspended vertically, is introduced in a resistor furnace of the type customarily used for tempering and heated to a mean temperature of 715° C. After a stay of one minute fifty seconds, two aluminum disks, 1 mm. thick, are placed 4 mm. away from the sheet, on both sides of the sheet center, and the heating continued for one minute. Then the screen is removed, the sheet withdrawn from the furnace and placed immediately between the blowing boxes of the type usually employed for rapid chilling in tempering operations.

In these conditions the isotropic stress in the protected zone represents a birefringence of 1.25 fringe per centimeter of glass passed through, while the tension at the interior, after relaxation of the hooping effect, amounts to 0.50 fringe per centimeter. Hence at the interior, these are an excess of compression of about 170 kg./cm.².

The tests above may be executed with the analytical instruments disclosed in the above-mentioned patents to applicant.

I claim:

1. A sheet of structural tempered glass having a first zone surrounding at least one interior reserved zone capable of resisting mechanical shock and bending stresses whereat the sheet may be perforated without development of incipient cracks or fracture in response to the shock imposed thereat, said reserved zone being compressed in all directions parallel to its face throughout its entire area and thickness, said compressional force being caused by the surrounding areas of said first zone of more highly tempered glass exerting a hooping effect on said reserved zone.

2. A sheet of structural tempered glass having a highly tempered zone surrounding at least one reserved zone of lower temper cable of resisting mechanical shock and bending stresses whereat the sheet may be perforated without development of incipient cracks or fracture in response to the shock imposed thereat, said reserved zone normally having tensile stresses parallel to the faces of the sheet in the core thereof in consequence of the tempered state thereof, said reserved zone being compressed in all directions parallel to its faces throughout its entire area and thickness by the hooping effect of the surrounding zone thereon, the magnitude of said hooping effect being such that the compressional stress exerted thereby exceeds even the tensile stresses at the core of the reserved zone by at least 20 kg./cm.².

3. An article as set forth in claim 2 wherein the sheet of glass has a thickness of 5 mm. to 8 mm. and the compressional stress on the inner layers of the reserved zone is between 20 and 200 kg./cm.².

4. An article as set forth in claim 2 wherein the sheet is rectangular and the reserved zones are located in at least two of the corners thereof.

5. A glass sheeting article having at least one zone compressed throughout its entire thickness under the hooping effect of the tempered surrounding zone, the resulting compression at the core of the compressed zone being greater than 20 kg./cm.², and the surrounding zone being protected by a frame which covers it entirely.

References Cited by the Examiner

UNITED STATES PATENTS

| | | | |
|---|---|---|---|
| 1,879,699 | 9/1932 | Long | 65—348 |
| 2,009,748 | 7/1935 | Sherwood | 65—115 |
| 2,177,324 | 10/1939 | Long | 65—112 |
| 2,262,545 | 11/1941 | Do Huu Chan | 65—111 |
| 2,311,846 | 2/1943 | Littleton | 65—114 XR |

(Other references on following page)

| | | | |
|---|---|---|---|
| UNITED STATES PATENTS | | | |
| 2,413,722 | 1/1947 | Long | 65—114 |
| 2,417,094 | 3/1947 | Spinasse | 65—194 XR |

FOREIGN PATENTS

| | | |
|---|---|---|
| 457,292 | 6/1949 | Canada. |
| 726,626 | 3/1955 | Great Britain. |
| 704,312 | 2/1954 | Great Britain. |
| 1,038,439 | 5/1953 | France. |
| 1,063,312 | 12/1953 | France. |

DONALL H. SYLVESTER, *Primary Examiner.*

ARTHUR P. KENT, *Examiner.*